US008565963B2

(12) United States Patent
Burke, Jr.

(10) Patent No.: US 8,565,963 B2
(45) Date of Patent: Oct. 22, 2013

(54) METHOD AND SYSTEM FOR REMOTELY TRACKING VEHICLE-CENTRIC DATA AND USER-CENTRIC DATA

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 379 days.

(21) Appl. No.: 12/889,009

(22) Filed: Sep. 23, 2010

(65) Prior Publication Data

US 2012/0078497 A1 Mar. 29, 2012

(51) Int. Cl.
*G06F 15/16* (2006.01)

(52) U.S. Cl.
USPC ....... 701/33.4; 701/33.2; 701/33.3; 701/34.3; 701/300

(58) Field of Classification Search
USPC ..................................................... 701/22, 33
See application file for complete search history.

(56) References Cited

U.S. PATENT DOCUMENTS

| | | | | |
|---|---|---|---|---|
| 5,452,211 | A | 9/1995 | Kyrtsos et al. | 364/449 |
| 5,768,319 | A | 6/1998 | Durboraw, III | 375/316 |
| 6,832,141 | B2 | 12/2004 | Skeen et al. | 701/35 |
| 6,853,956 | B2 | 2/2005 | Ballard, Jr. et al. | 702/183 |
| 6,925,368 | B2 | 8/2005 | Funkhouser et al. | 701/33 |
| 7,647,392 | B2 | 1/2010 | Sharma et al. | 709/223 |
| 2005/0130590 | A1 | 6/2005 | Pande et al. | 455/12.1 |
| 2008/0082221 | A1 | 4/2008 | Nagy | 701/2 |
| 2010/0286912 | A1 * | 11/2010 | Inoue | 701/215 |

FOREIGN PATENT DOCUMENTS

| | | | |
|---|---|---|---|
| GB | 2378071 | * | 8/2002 |
| JP | 09-113600 | * | 2/1997 |

OTHER PUBLICATIONS

On Board Diagnostics; http://en.wikipedia.org/wiki/On-board_diagnostics; retrieved on Aug. 30, 2010.

* cited by examiner

*Primary Examiner* — Thomas Tarcza
*Assistant Examiner* — Maceeh Anwari
(74) *Attorney, Agent, or Firm* — Luis M. Ortiz; Kermit D. Lopez; Kevin Soules

(57) ABSTRACT

A system and method for tracking a vehicle-centric data and a user-centric data with respect to a vehicle. A vehicle-based device can be configured with a vehicle-based application in order to collect and cache the vehicle-centric data. Additionally, an existing vehicle data interface can provide such vehicle-centric data and other data. A GPS-enabled wireless communications device configured with a vehicle and user data tracking module can be interfaced with the vehicle-based device via a wireless technology in order to retrieve the vehicle-centric data with respect to the vehicle. The user-centric data can also be collected from the wireless communications device via a wireless application when the user is external to the vehicle. The vehicle-centric data and the user-centric-data can be then transmitted to a centralized server in order to track a historical and real time GPS location and navigation data.

20 Claims, 4 Drawing Sheets

METHOD AND SYSTEM FOR REMOTELY TRACKING VEHICLE-CENTRIC DATA AND USER-CENTRIC DATA

TECHNICAL FIELD

Embodiments are generally related to location and tracking systems and methods. Embodiments also relate to GPS (Global Positioning System) devices, systems and methods. Embodiments additionally relate to vehicle data interfaces and the remote tracking of vehicle-centric data and/or user-centric data.

BACKGROUND OF THE INVENTION

A vehicle tracking system can combine the installation of an electronic device in a vehicle (or a fleet of vehicles), with software applications to enable a third party to track the location of the vehicle, collect data and deliver the data to a base of operation for processing and further analysis. Modern vehicle tracking systems commonly utilize well-known GPS technology for locating a vehicle. Such vehicle tracking systems can be employed by a fleet operator for a fleet management function such as, for example, routing, dispatch, on-board information and security. The vehicle information can be viewed on an electronic map via the Internet and/or specialized software.

Prior art vehicle tracking systems can be employed to track either user-centric data with respect to a user or vehicle-centric data with respect to the vehicle. A vehicle based GPS solution bound to the vehicle does not, however, follow the user and therefore lacks portability and user-centric data requirements and perspectives. Similarly, a user-centric GPS solution possesses a portable navigation application with very ineffective mileage and vehicle data, because such a user-centric GPS solution is not actually integrated with the vehicle and lacks vehicle monitoring fleet management data capabilities.

Based on the foregoing, it is believed that a need exists for an improved method and system for remotely tracking vehicle-centric data and user-centric data with respect to a vehicle, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved vehicle tracking method and system.

It is another aspect of the disclosed embodiments to provide for an improved method and for remotely tracking vehicle-centric data and user-centric data with respect to a vehicle.

It is further aspect of the disclosed embodiments to provide for an improved method and system for collecting vehicle-centric data and user-centric data via a remote service application.

The aforementioned aspects and other objectives and advantages can now be achieved as described herein. A method and system for tracking vehicle-centric data and user-centric data with respect to a vehicle, is disclosed herein. A vehicle-based device can be configured with a vehicle-based application in order to collect and cache the vehicle-centric data. A GPS-enabled wireless communications device (e.g., laptop, cell phone, PDA, etc.) configured with a vehicle and a user data tracking module can be interfaced with the vehicle-based device (e.g., an OBD-II interface device) via a wireless technology (e.g., Bluetooth technology) in order to retrieve the vehicle-centric data with respect to the vehicle. The user-centric data can also be collected from the GPS-enabled wireless communications device via a wireless application when the user is located external to the vehicle. The vehicle-centric data and the user-centric-data can be then transmitted to a centralized server in order to process and track a historical and real time GPS location and navigation data.

The vehicle-based device described herein can be interfaced with a vehicle data-processing unit via wireless technology, a hard-wired connection and/or defined access points in order to collect the vehicle-centric data. The vehicle-based device can be synchronized with the mobile application to exchange the vehicle and device data and status. The vehicle centric data (e.g., speed, start, stop, idle, breaking and location data) can be collected from the vehicle data-processing unit by caching the data, until the data is pushed/pulled to the wireless application and by querying the vehicle data-processing unit and/or an existing vehicle interface for vehicle data in real time. An update with respect to the vehicle and user data tracking module and the vehicle-based application from the centralized server can be transmitted to the wireless communications device and the vehicle-based device to ensure that best software functionality is available with respect to the devices.

The user-centric (e.g., user location data) and the vehicle-centric data can be transmitted between the wireless communications device and the server via a data transportation medium (e.g., a SMS, E-mail, Https, SOAP, and BlackBerry MDS). The vehicle odometer, maintenance, performance and activity can be integrated with a user focused GPS navigation solution as they enter and exit the vehicle automatically by time-stamping of the synchronizing and desynchronizing of the devices. The system can track a person outside the vehicle and provide navigation instructions via a cheaper (cellular) data transmission route of fleet data. Such an approach can be effectively employed in wide range of applications such as, for example, heating and cooling monitors, security systems, home appliances, home entertainment systems, rendering devices and/or publishing systems.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
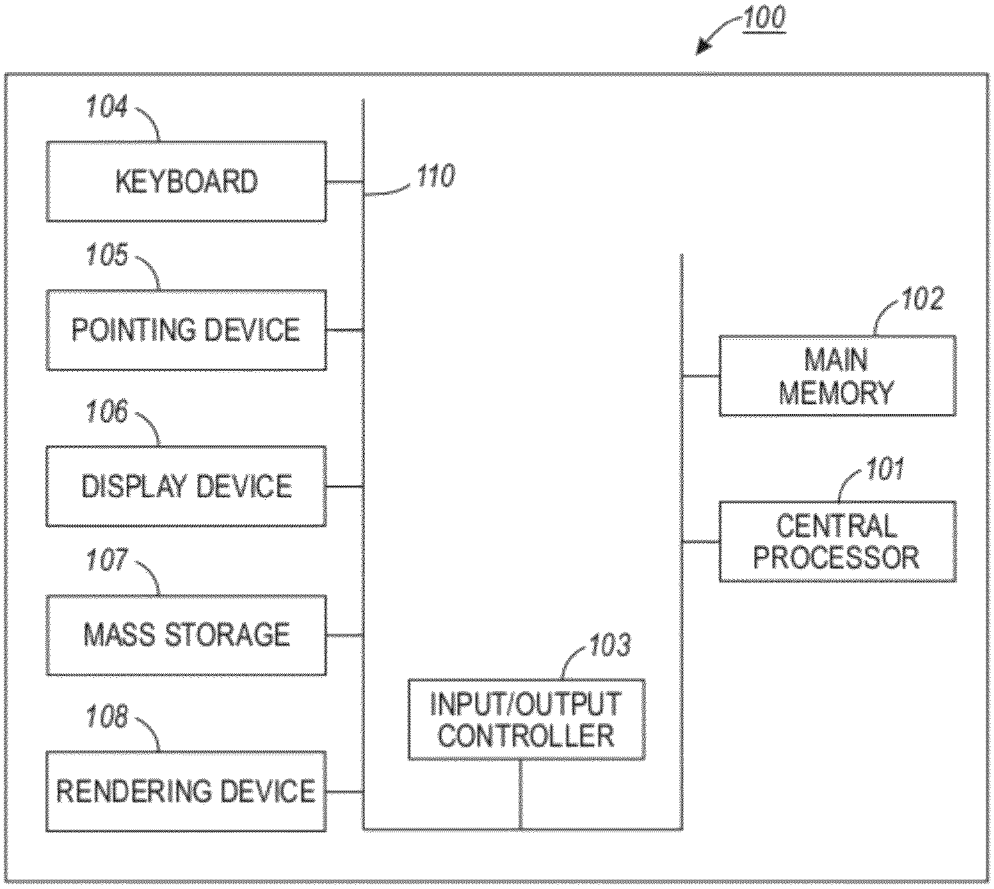
FIG. 1 illustrates a schematic view of a computer system, in accordance with the disclosed embodiments.
Figure 2:
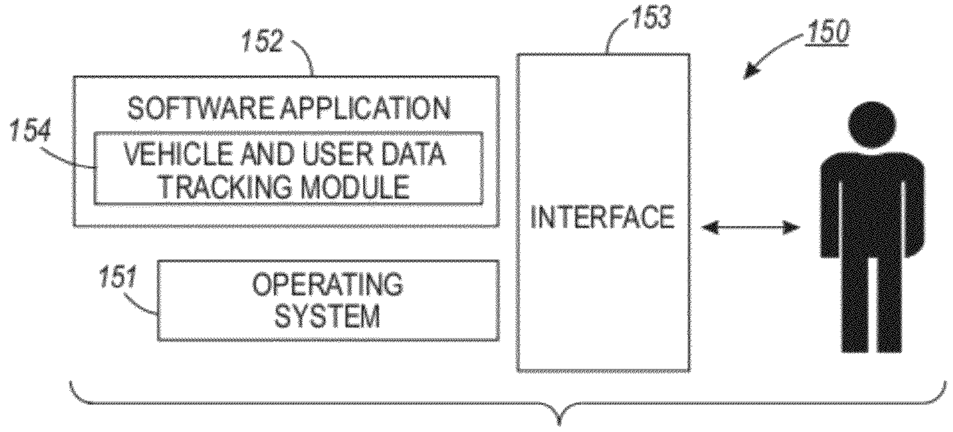
FIG. 2 illustrates a schematic view of a software system including a vehicle and user data tracking module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, and a mass storage 107 (e.g., a hard disk). Additional input/output devices such as, a keyboard 104, an input device 105 (e.g., a pointing device, such as a mouse, track ball, pen device, etc), and a display device 106 may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of systems are potential. For example, rather than a traditional "Windows" system, other operation systems, such as, for example, a Real Time Operating System (RTOS) more commonly employed in wireless systems may also be employed with respect to operating system 151 and interface 153. The software application 154 can include, for example, a vehicle and user data tracking module for tracking user-centric data and vehicle-centric data with respect to a user and a vehicle. The vehicle and user data tracking module 154 can include instructions, such as those of method 400 discussed herein with respect to FIG. 5.

FIGS. 1-2 are thus intended as an example, and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 3:
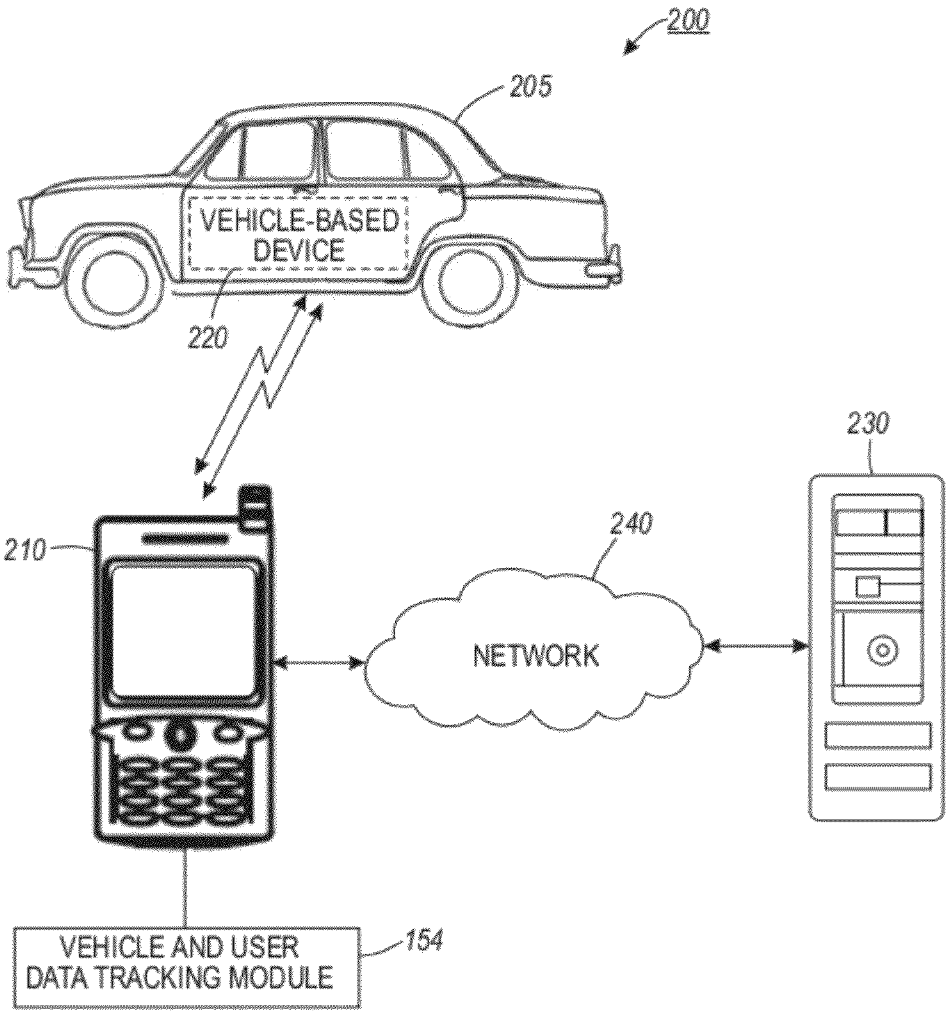
FIG. 3 illustrates a graphical representation of a vehicle tracking system with respect to an vehicle, in accordance with the disclosed embodiments.

FIG. 3 illustrates a graphical representation of a vehicle tracking system 200 associated with a network 240, in accordance with the disclosed embodiments. Note that in FIGS. 1-5 identical parts or elements are generally indicated by identical reference numerals. The vehicle tracking system 200 includes a GPS enabled wireless mobile communications device 210, a vehicle-based device 220 located on a vehicle 205, and a centralized server 230. Note that the embodiments discussed herein generally relate to a vehicle. It can be appreciated, however, that such embodiments can be implemented in the context of other systems and designs, and are not limited to the automotive field. The discussion of a vehicle, as utilized herein, is presented for general illustrative purposes only.

The vehicle-based device 220 such as, for example, an On-Board Diagnostics interface device, or OBD, is a generic term referring to a vehicle's self-diagnostic and reporting capability. The OBD device provides the vehicle owner or a repair technician access to state of health information for various vehicle sub-systems. The vehicle based device 220 associated with the vehicle 205 interfaces with the mobile communications device 210 via a wireless technology. Note that the wireless technology can be, for example, Bluetooth technology. In general, Bluetooth is an open wireless technology standard for exchanging data over short distances (using short wavelength radio transmissions) from fixed and mobile devices, creating personal area networks (PANs) with high levels of security.

The mobile communications device 210 can be configured with the vehicle and user data-tracking module 154 to effectively track the location and navigation data with respect to the vehicle 205 and a user 290 (e.g., a driver). Note that the vehicle 205 described herein can be, for example, an automobile, a truck, a van, a sport utility vehicle, a minivan and the like. The mobile communications device 210 collects a vehicle centric data 260 from the vehicle-based device 220 and/or an existing vehicle data interface (e.g., OnStar, Ford Sync, etc) and a user-centric data 215 via a wireless application 250 when the user 290 is external to the vehicle 205. Note that the mobile communications device 210 described herein can be for example, a laptop, a personal digital assistant, Smartphone, etc. The mobile communications device 210 further transmits the user-centric data 215 and the vehicle-centric data 260 to the centralized server 230 via the network 240 in order to provide automatic navigation assistance.

The centralized server 230 typically provides route guidance, intelligent vehicle highway systems for road tolling and traffic flow assessment and route diversions, vehicle's position and movement tracking. The remote centralized server 230 also permits a system administrator to monitor and access the location data and vehicle data transmitted from the mobile device 210. The location data and vehicle data provided by the remote centralized server 230 can be for example, a security report, a fleet and resource management data, a location based tracking report and, vehicle tracking data and the like.

The vehicle tracking system 200 associated with the network 240 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, the vehicle tracking system 200 also may be implemented as a number of different types of networks, such as, for example, an intranet, a local area network (LAN), or a wide area network (WAN). FIG. 1 is intended as an example, and not as an architectural limitation for different embodiments of the present invention.

Figure 4:
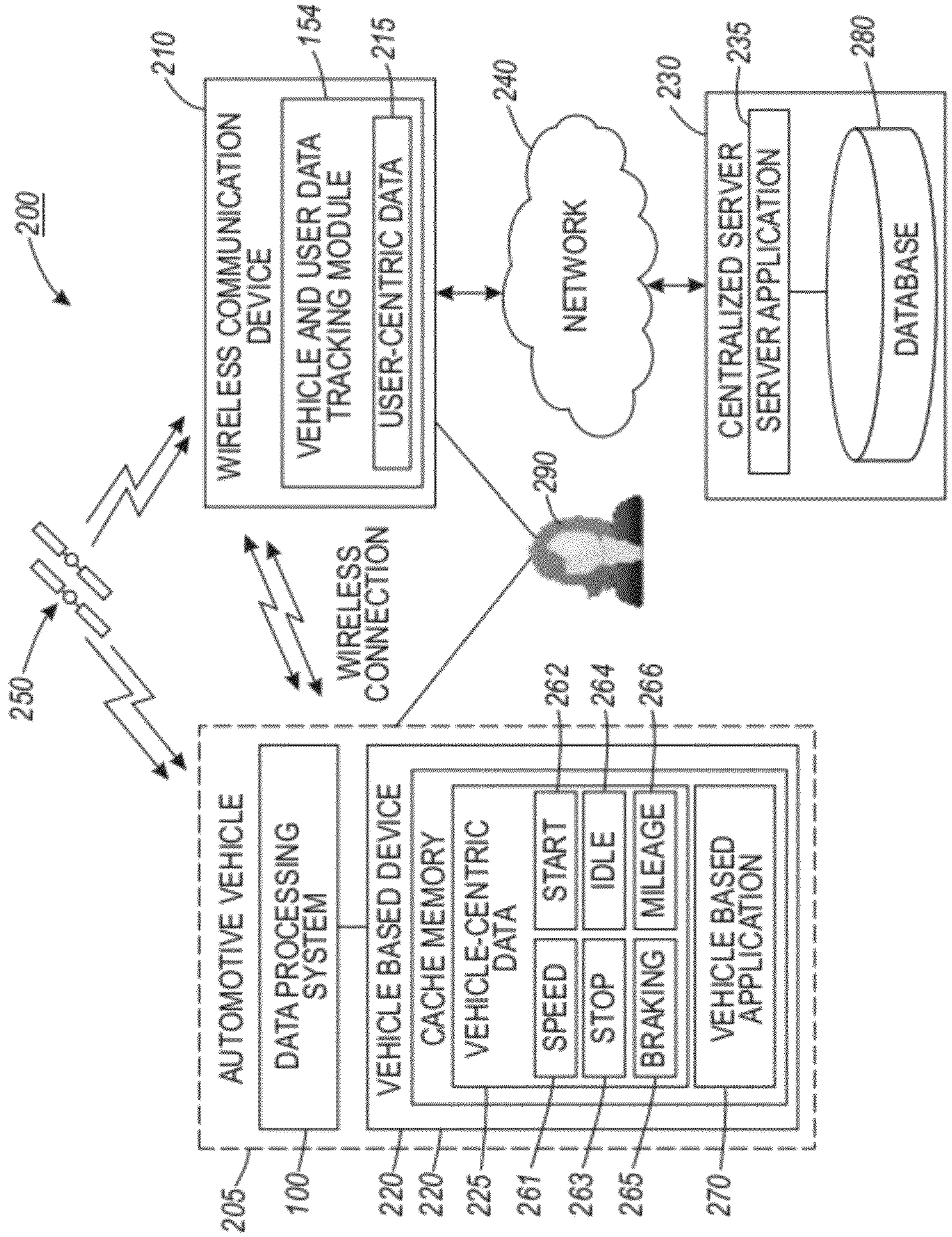
FIG. 4 illustrates a block diagram of the vehicle tracking system for collecting vehicle-centric data and user-centric data, in accordance with the disclosed embodiments.

FIG. 4 illustrates a block diagram of the vehicle tracking system 200 for collecting the vehicle-centric data 260 and the user-centric data 215, in accordance with the disclosed embodiments. The vehicle tracking system 200 includes the GPS enabled wireless communication mobile device 210 configured with the vehicle 205 and user data tracking module 154. The mobile communications device 210 can be interfaced with the vehicle-based device 220 via the wireless technology in order to retrieve the vehicle-centric data 260 with respect to the vehicle 205. The mobile communications device 210 and the vehicle-based device 220 utilize a GPS-network 250 to track the location of the user 290 and the vehicle 205. Note that the GPS network 250 can be employed for obtaining a terrestrial position fix (latitude, longitude, and altitude) of the user 290 and/or the vehicle 205. It has been widely known that mobile terminals (such as, but not limited to, cellular telephones, personal digital assistants, etc.) in modern wireless telecommunications systems include a capability to receive GPS signals and calculate position on the surface of the Earth.

The vehicle centric data 260 with respect to the vehicle 205 can, for example, include data related to one or more parameters, such as, speed 261, start 262, stop 263, idle 264, braking 265, mileage 266 and location data with respect to the vehicle 205. The vehicle-based device 220 can be interfaced with a vehicle data-processing unit 100 via the wireless technology, a hard wired connection and/or a defined access points in order to collect the vehicle-centric data 260. The vehicle centric data 260 can be collected from the vehicle data-processing unit 100 and/or, for example, an existing vehicle data interface, by caching the data until pushed/pulled to the mobile communications device 210 by querying the vehicle data-processing unit 100 in real time when the wireless communications device 210 and vehicle-based device 220 are synchronized.

The vehicle-based device 220 can be synchronized with the mobile device application 210 in order to exchange vehicle and device data and status. The location data of the vehicle 205 can be determined utilizing a vehicle based application 270 associated with the vehicle based device 220. The vehicle-centric data 260 and the user-centric-data 215 can be then transmitted to the centralized server 230 via a server application 235 in order to track historical and real time GPS location and navigation data with respect to the user 290 and/or the automotive vehicle 205. The mobile communications device 210 communicates the user-centric data 215 and the vehicle-centric data 260 to the centralized server 230 via a data transportation medium. The transportation medium can be, for example, short message service (SMS), electronic mail, hypertext transfer protocol (http), hypertext transfer protocol secure (https), Simple Object Access Protocol (SOAP), Mobile Data Service (MDS), Business to Business (B2B) application.

Note that the vehicle-based device 220 can also be implemented as, for example, a vehicle data interface or an existing vehicle data interface in association with or as a supplement to the vehicle-based device 220. Such a vehicle data interface can provide data, such as, for example, the vehicle-centric data 260 and/or user-centric-data 215 described herein. One example of a vehicle data interface is the "OnStar" system. "OnStar" is a subscription-based communications service available with certain General Motors vehicles and can utilize mobile phone networks to allow users to contact service representatives, and allow service representatives limited control over the electronic systems of users' vehicles. Another example of a vehicle data interface is Ford SYNC, which is a factory-installed, in-car communications and entertainment system developed by Ford and Microsoft. The Ford SYNC system allows drivers to bring nearly any mobile phone and some digital media players into their vehicle and operate them using voice commands, the vehicle's steering wheel, or radio controls. Thus, such vehicle data interfaces can be queried for their data and adapted for use in accordance with alternative embodiments.

The user-centric data 215 and the vehicle-centric data 260 transmitted to the centralized server 230 can be stored in a database 280 associated with the centralized server 230. The remote centralized server 230 further permits a system administrator to monitor and access the user-centric data 215 and the vehicle-centric data 260 transmitted from the mobile communications device 210. The update with respect to the vehicle and user data tracking module 154 and the vehicle-based application 270 from the centralized server 230 can be transmitted to the wireless communications device 210 and the vehicle-based device 220 to ensure that the best software functionality is available with respect to the devices 210 and 220. The application updates provided by the centralized server 230 ensures best software functionality of the vehicle-based device 220. The centralized server 230 can be controlled utilizing a web administration site. The centralized server 230 also includes a defined B2B data exchange interface with respect to the mobile device 210. The system 200 can therefore track the user 290 outside the vehicle and provide navigation instructions via an inexpensive (e.g., cellular) data transmission route of fleet data.

Figure 5:
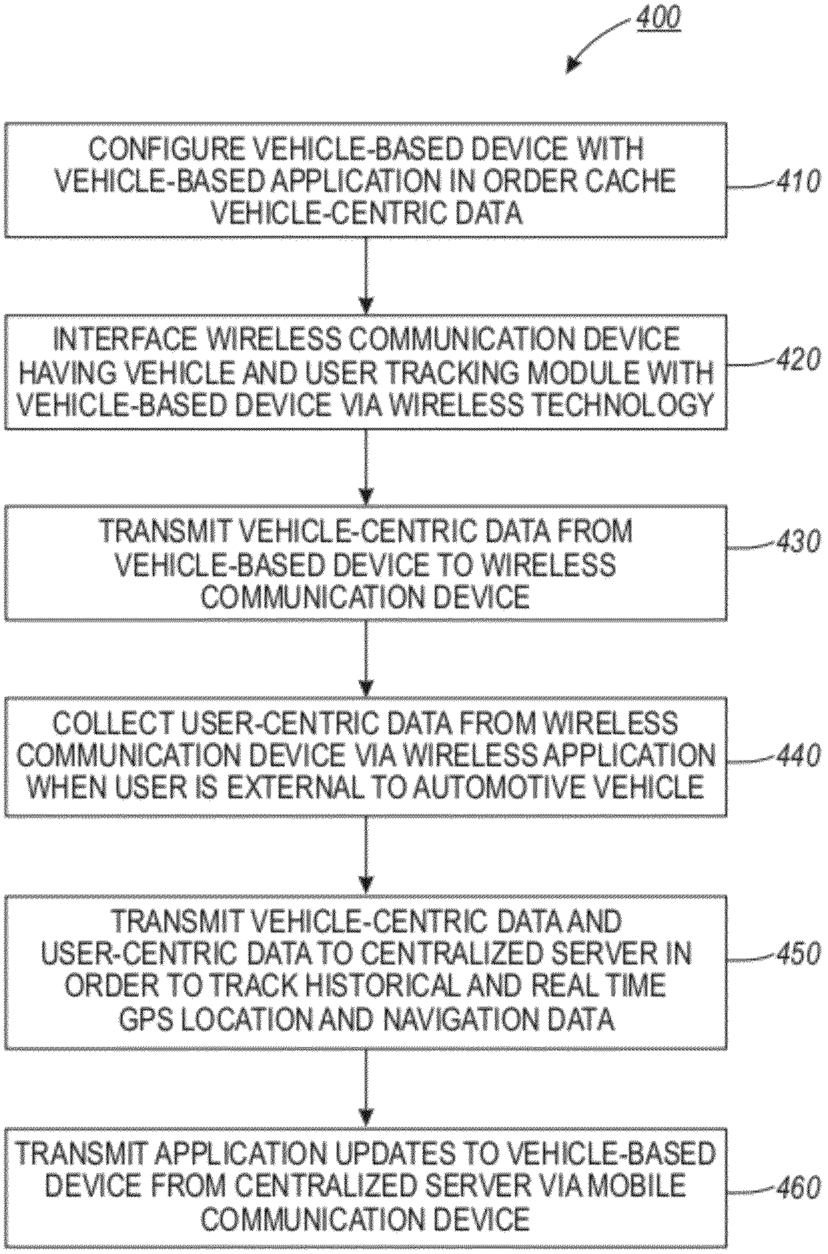
FIG. 5 illustrates a high level flow chart of operations illustrating logical operational steps of method for remotely tracking the vehicle-centric data and the user-centric data from a remote service application, in accordance with the disclosed embodiments.

FIG. 5 illustrates a high level flow chart of operations illustrating logical operational steps of method 400 for remotely tracking the vehicle-centric data 260 and the user-centric data 215, in accordance with the disclosed embodiments. Note that the method 400 can be implemented in the context of a computer-useable medium that contains a program product, including, for example, a module or group of modules. The vehicle based device 220 can be configured with the vehicle based application 270 in order to collect and cache the vehicle centric data 260 associated with the vehicle 205, as depicted at block 410. The wireless mobile communications device 210 having the vehicle and user data tracking module 154 can be interfaced with the vehicle-based device 220 via the wireless technology, as illustrated at block 420. The vehicle centric data 260 with respect to the vehicle 205 can be transmitted to the mobile communications device 210, as illustrated at block 430. The user-centric data 215 with respect to the user 290 can be collected from the mobile communications device 210 when the user 290 is external to the vehicle 205, as indicated at block 440.

The vehicle-centric data 260 and the user-centric data 215 can be further transmitted to the centralized server 230 utilizing the vehicle and user data tracking module 154 in order to track historical and real time GPS location and navigation data, as depicted at block 450. Thereafter, as illustrated at block 460, the software application updates can be transmitted to the vehicle based device 220 from the centralized server 230 via the wireless communications device 210. Such an approach can be effectively employed in a wide range of applications such as, for example, heating and cooling monitors, security systems, home appliances, home entertainment systems, rendering devices and/or publishing systems.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle tracking system, comprising:

a vehicle-based device located in a vehicle configured with a vehicle-based application, wherein said vehicle-based device collects and caches vehicle-centric data comprising speed, starts, stops, idle time, breaking time, mileage and location with respect to said vehicle while said vehicle is being operated;

a wireless communications device having a vehicle and user data tracking application, wherein said wireless communications device collects user-centric data comprising navigational and tracking data only when a user is external to said vehicle, and interfaces with said vehicle-based device via a wireless technology in order to retrieve said user-centric data and said vehicle-centric data with respect to said vehicle; and a centralized server that collects said vehicle-centric data and said user-centric-data from said wireless communications device in order to track historical and real time location and navigation data.

2. The system of claim 1 wherein said vehicle-based device collects and caches said vehicle-centric data from an existing vehicle data interface associated with said vehicle.

3. The system of claim 1 further comprising a data-processing unit interfaced with said vehicle-based device via a communications medium in order to collect said vehicle-centric data.

4. The system of claim 3 wherein said communications medium comprises at least one of the following:

a wireless communications module;

a hard wired communications connection; and a defined communications access point.

5. The system of claim 1 further comprising a wireless module configured with said wireless communications device, wherein said wireless module collects said user-centric data from said wireless communications device when a user is external to the vehicle.

6. The system of claim 4 wherein said communications medium further comprises a GPS module that wirelessly communicates GPS data with respect to said vehicle.

7. The system of claim 1 wherein said vehicle-based device synchronizes with said vehicle and user data tracking application to exchange said vehicle-centric data and status information.

8. The system of claim 1 further comprising an update with respect to said vehicle and user data tracking application and said vehicle-based application from said centralized server transmitted to said wireless communications device and said vehicle-based device.

9. The system of claim 1 further comprising a data transportation medium for transmitting said user-centric and said vehicle-centric data between said wireless communications device and said server.

10. The system of claim 9 wherein said data transportation medium comprises at least one of the following types of medium:

a short message service; an electronic mail;

a hypertext transfer protocol;

a hypertext transfer protocol secure;

a simple object access protocol; and a business to business application.

11. The system of claim 1 wherein said wireless technology comprises a Bluetooth technology.

12. The system of claim 1 wherein said wireless communications device comprises at least one of the following types of devices:

a laptop computer;

a mobile communications device;

a personal digital assistant; and a Smartphone.

13. The system of claim 1 wherein said vehicle-based device comprises an on-board diagnostic interface device.

14. A method, comprising:

collecting vehicle-centric data comprising speed, starts, stops, idle time, breaking time, mileage and location with respect to a vehicle via a vehicle-based device located in said vehicle configured with a vehicle-based application;

interfacing a wireless communications device having a vehicle and user data tracking module with said vehicle-based device via a wireless technology in order to thereafter retrieve said vehicle-centric data and collect a user-centric data comprising navigational and tracking data of a user when said user is external to said vehicle via said wireless communications device; and transmitting said vehicle-centric data and said user-centric-data from said wireless communications device to a centralized server in order to track a historical and real time location and navigation data.

15. The method of claim 14 further comprising interfacing said vehicle-based device with a vehicle data-processing unit via said wireless technology in order to collect said vehicle-centric data.

16. The method of claim 14 further comprising collecting said user-centric data via a wireless application configured with said wireless communications device when a user is external to said vehicle.

17. The method of claim 15 further comprising:

caching said vehicle centric data until said vehicle-centric data is pushed/pulled to said wireless application; and querying in real time, said vehicle data-processing unit and an existing vehicle data interface associated with said vehicle, when said wireless communications device and said vehicle-based device are synchronized in order to collect said vehicle centric data from said vehicle data-processing unit.

18. The method of claim 14 further comprising synchronizing said vehicle-based device with a mobile application to exchange said vehicle-centric data and vehicle status information.

19. The method of claim 14 further comprising transmitting an update with respect to said vehicle and user data tracking module and said vehicle-based application from said centralized server to said wireless communications device and said vehicle-based device.

20. The method of claim 14 further comprising transmitting said user-centric and said vehicle-centric data between said wireless communications device and said server via a data transportation medium.

* * * * *